May 13, 1952    D. H. MONTGOMERY    2,596,501
SPROCKET OR THE LIKE
Filed Feb. 14, 1947
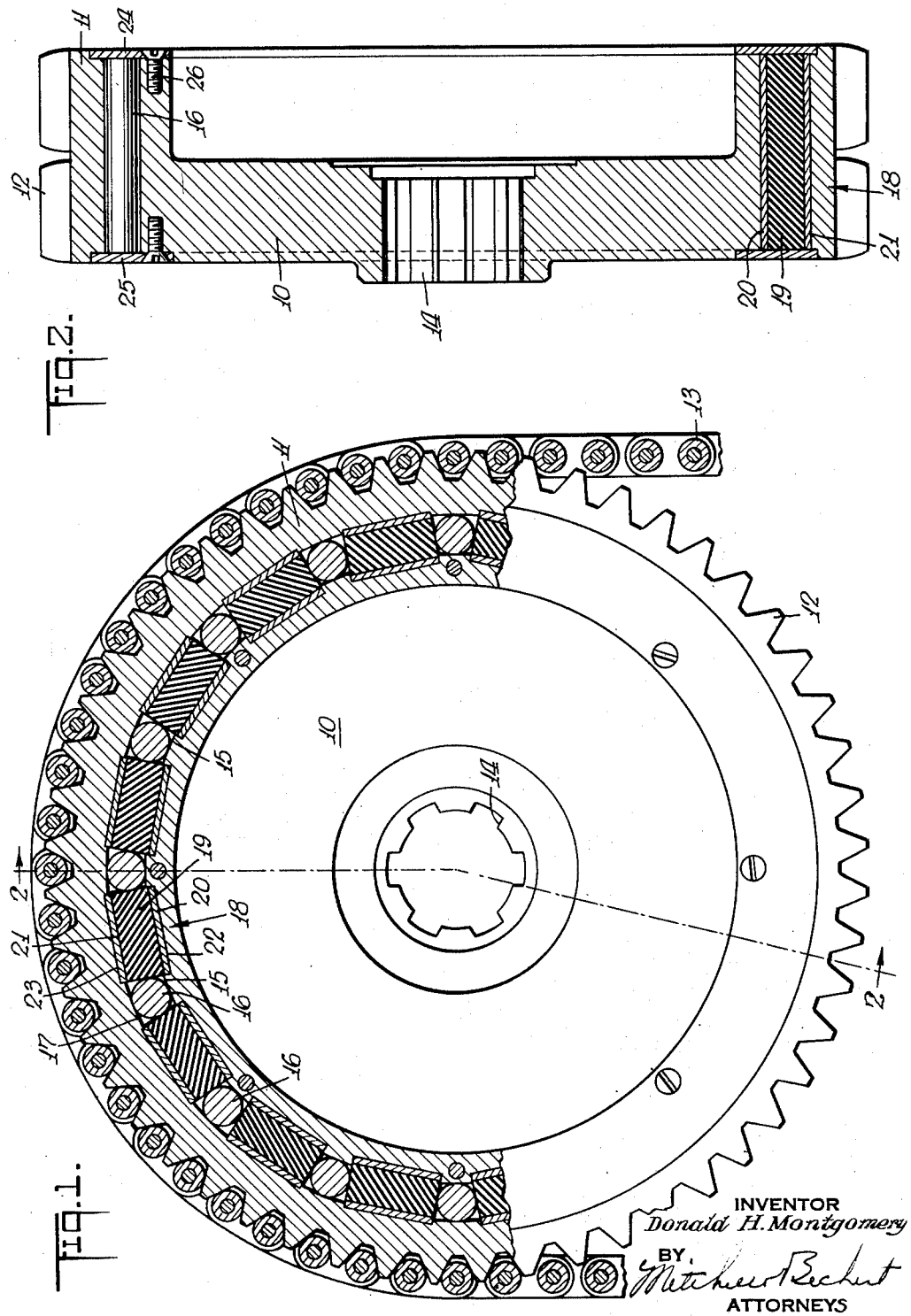
INVENTOR
Donald H. Montgomery
BY
Mitchell Bechet
ATTORNEYS Patented May 13, 1952

2,596,501

UNITED STATES PATENT OFFICE 2,596,501

SPROCKET OR THE LIKE

Donald H. Montgomery, West Hartford, Conn., assignor to The New Britain Machine Company, New Britain, Conn., a corporation of Connecticut Application February 14, 1947, Serial No. 728,694

6 Claims. (Cl. 64—27)

My invention relates to power-transmitting devices, and in particular to a torsionally resilient wheel or the like construction.

In many power-transmitting applications, it is desirable to provide a smooth flow of power from a power source in which there may be intermittent or oscillating power surges. In other cases, it is desirable to provide means whereby an intermittent load may be sustained by a given power source, without reflection of excessive transients back to the power source. In the past, it has been a practice to meet these requirements by a construction employing coil springs so placed as resiliently to absorb torsional transients, but in many applications the inherent properties of these springs tend to limit the effectiveness of the construction. Such limitations are apparent in the tendency of the structures to contribute to (and amplify) torsional or angular oscillations in the system—with destructive effects upon the power source and on other parts of the power-transmitting mechanism.

It is an object of my invention to provide an improved power-transmitting mechanism, wherein torsional shock may be resiliently absorbed and wherein the tendency toward torsional oscillation in the system may be substantially reduced.

It is another object to provide means whereby the life of a power-transmitting system may be prolonged even in the presence of transient-load conditions and of uneven flow of power from the power source.

Other objects and various further features of the invention will be pointed out or will occur to those skilled in the art from a reading of the following specification in conjunction with the accompanying drawings.

Fig. 1 is a partially sectionalized plan view of a sprocket-wheel incorporating features of the invention; and Fig. 2 is a sectionalized view taken substantially in the plane 2—2 of Fig. 1.

Broadly speaking, my invention contemplates a power-transmitting device including an inner and an outer member with anti-friction means for radially spacing these members. Resilient means of rubber-like material is held in fixed abutment with parts of both members, whereby these members are permitted a slight relative rotation that is resiliently absorbed. In the specific form to be described, the inner and the outer members are provided with a plurality of arcuate surfaces to accommodate antifriction bearing elements, and the spaces between arcuate surfaces are recessed to accommodate the torsional shock absorbers. These shock absorbers are preferably of neoprene or other rubber-like material and comprise blocks to which metal plates have been bonded for cooperative engagement with the recesses between arcuate surfaces.

Referring to the drawings, my invention is shown in application to a sprocket-wheel comprising an inner or hub member 10 and an outer member 11 extending circumferentially thereof. The outer member 11 may be annular and include a number of teeth 12 for engagement with a drive chain or the like 13. The inner or hub member 10 may be splined as at 14 for locking engagement with a shaft or the like (not shown). The inner member 10 preferably includes a plurality of arcuate surfaces 15 spaced circumferentially about said inner member, for cooperation with antifriction bearing elements 16 spacing the members 10 and 11. The outer member 11 also preferably includes a corresponding plurality of arcuate surfaces 17 for engagement with the antifriction elements 16, and all arcuate surfaces 15—17 are preferably arcuate about the axis of the assembled sprocket-wheel.

In accordance with the invention, I provide members 18 of resilient material in locking engagement with both the inner and outer members 10 and 11. In the form shown, these members 18 comprise blocks of rubber-like material to which metal plates 20—21 have been bonded. The plates 20—21 fit in suitably formed recessed portions 22—23 in the inner and outer members 10 and 11, and these recessed portions may be located in the spaces between the antifriction bearing elements 16. The antifriction bearing elements 16 may comprise rollers extending substantially the full width or thickness of the sprocket-wheel, and the resilient blocks 18 may likewise extend substantially the width of the wheel. To retain all members in finally assembled position, annular covering plates 24—25 may be fixed as by screws 26 to one of the members 10 or 11.

It will be appreciated that the described resilient construction is relatively simple to assemble and that it may serve as an effective "filter" for attenuating such oscillations as may occur in a particular transmitting system. The construction provides for the sustaining of heavy radial loads, while permitting a maximum of angular or torsional resiliency. The resilient members 18 may be applied by merely sliding them into position between adjacent rollers. By selecting blocks of correct hardness and other properties, desired filtering effects may be obtained. In some applications, it is preferable to employ blocks 18 of different hardness and absorptive qualities in the same installation—thus producing a shock-absorbing wheel in which there may be substantially no inherent tendency toward torsional oscillation at any particular frequency and in which a maximum attenuation of oscillations due to outside causes may be effected.

Although I have described my invention in detail for a preferred form as applied to a sprocket-wheel, it will be understood that modifications may be made to the form shown and that these modifications may be adapted to other power-transmitting devices without departure from the scope of the invention as defined in the claims which follow.

I claim:

1. In a device of the character indicated, an inner member including a plurality of angularly spaced outer arcuate surfaces arcuate about substantially a common axis, an annular outer member having a plurality of angularly spaced arcuate inner surfaces arcuate about substantially a common axis, antifriction means abutting the arcuate surfaces of both said members, whereby said outer member may be radially spaced from said inner member with freedom for partial relative rotation of said members, and a plurality of resilient members of rubber-like material in the angular spaces between said arcuate surfaces and in engagement with the said inner and outer members, the effective angular width of said arcuate surfaces about said axis being substantially equal to the effective angular width of each said antifriction means, whereby said resilient members may retain said antifriction means.

2. A device according to claim 1, in which said resilient members each comprise a block of rubber-like material and plate members bonded to opposite sides of said block.

3. In a device of the character indicated, an inner member, an outer member extending circumferentially of said inner member, a plurality of uniformly angular spaced blocks of resilient material extending radially between said members, antifriction rollers between said blocks, and retainer means carried by one of said members and spanning parts of the longitudinal ends of said blocks and of said rollers.

4. In a device of the character indicated, an inner member including a plurality of angularly spaced outer arcuate surfaces arcuate about substantially a common axis, an annular outer member having a plurality of angularly spaced arcuate inner surfaces arcuate about substantially a common axis, said members having recessed portions between said arcuate surfaces, antifriction means abutting the arcuate surfaces of both said members, whereby said outer member may be radially spaced from said inner member with freedom for partial relative rotation of said members, and a plurality of resilient members of rubber-like material in the angular spaces between said arcuate surfaces and in engagement with said inner and outer members, said resilient members each including a block of rubber-like material with rigid members bonded to opposite sides thereof for engagement with said recessed portions.

5. In a device of the character indicated, an inner member, an outer member extending circumferentially and continuously of said inner member, a plurality of uniformly angularly spaced blocks of resilient material extending radially between said members, and rolling antifriction elements between said blocks and radially spacing said members, said blocks being angularly spaced from each other by an amount substantially equal to the radial clearance of said members at the spaces between blocks, whereby said blocks may serve to angularly retain said antifriction elements.

6. In a device of the character indicated, an inner member, an outer member extending circumferentially continuously of said inner member, a plurality of uniformly angularly spaced blocks of resilient material extending radially between said members, and rollers between said blocks and radially spacing said members, said rollers having substantially the same dimensions longitudinally of said device as do said blocks.

DONALD H. MONTGOMERY.

REFERENCES CITED

The following references are of record in the file of this patent:

UNITED STATES PATENTS

| Number | Name | Date |
| --- | --- | --- |
| 1,663,803 | Link | Mar. 27, 1928 |
| 1,733,771 | Baker | Oct. 29, 1929 |
| 2,231,769 | Merrill | Feb. 11, 1941 |
| 2,238,531 | Malmquist | Apr. 15, 1941 |
| 2,252,335 | Steward | Aug. 12, 1941 |
| 2,457,507 | Strachovsky | Dec. 28, 1948 |
| 2,477,175 | Gee | July 26, 1949 |

FOREIGN PATENTS

| Number | Country | Date |
| --- | --- | --- |
| 26,488 | Great Britain | 1907 |
| 478,676 | Great Britain | 1938 |